Aug. 4, 1931.   E. A. RYDER   1,817,650
VARIABLE SPEED SUPERCHARGER DRIVE
Filed Jan. 31, 1927   2 Sheets-Sheet 1
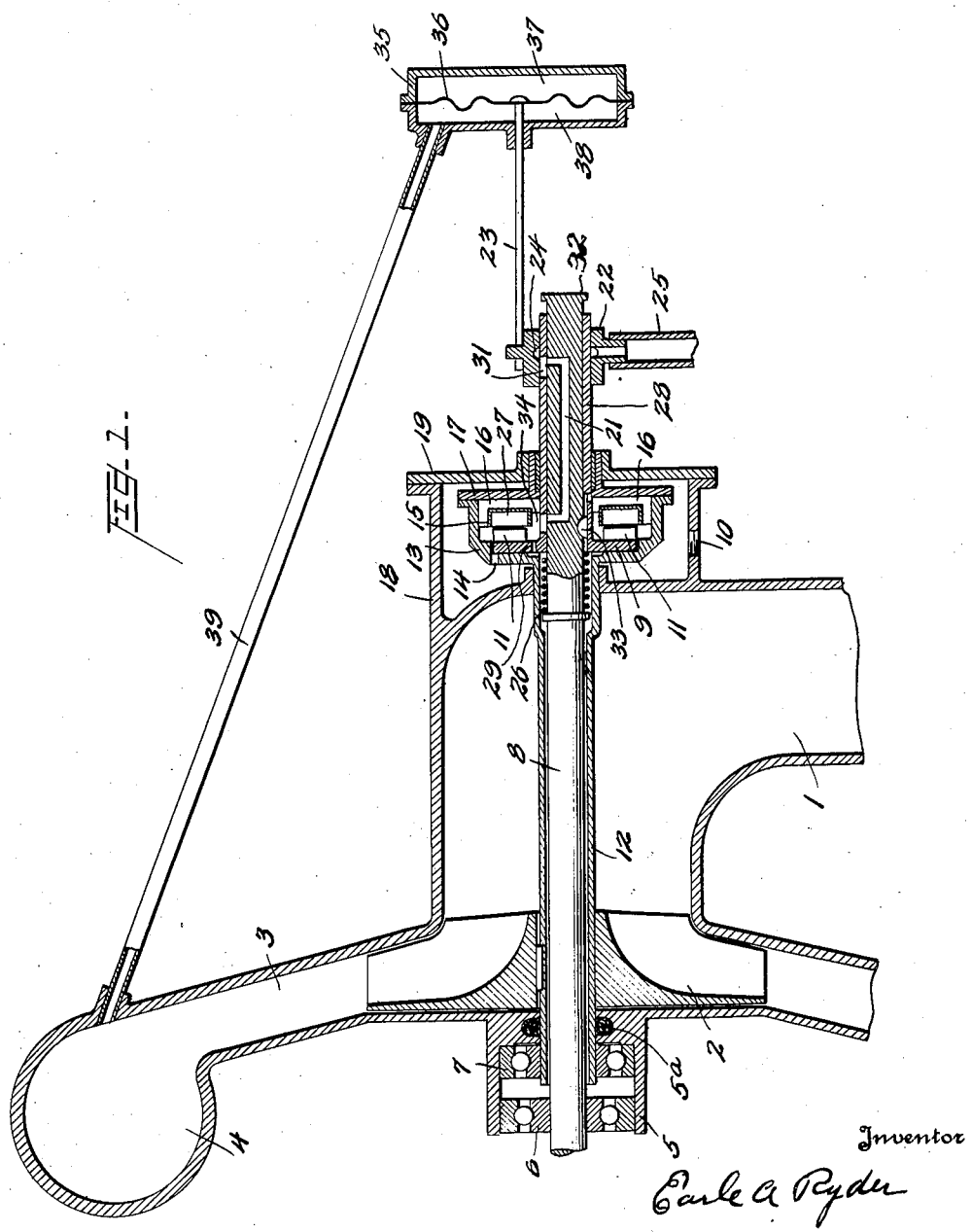

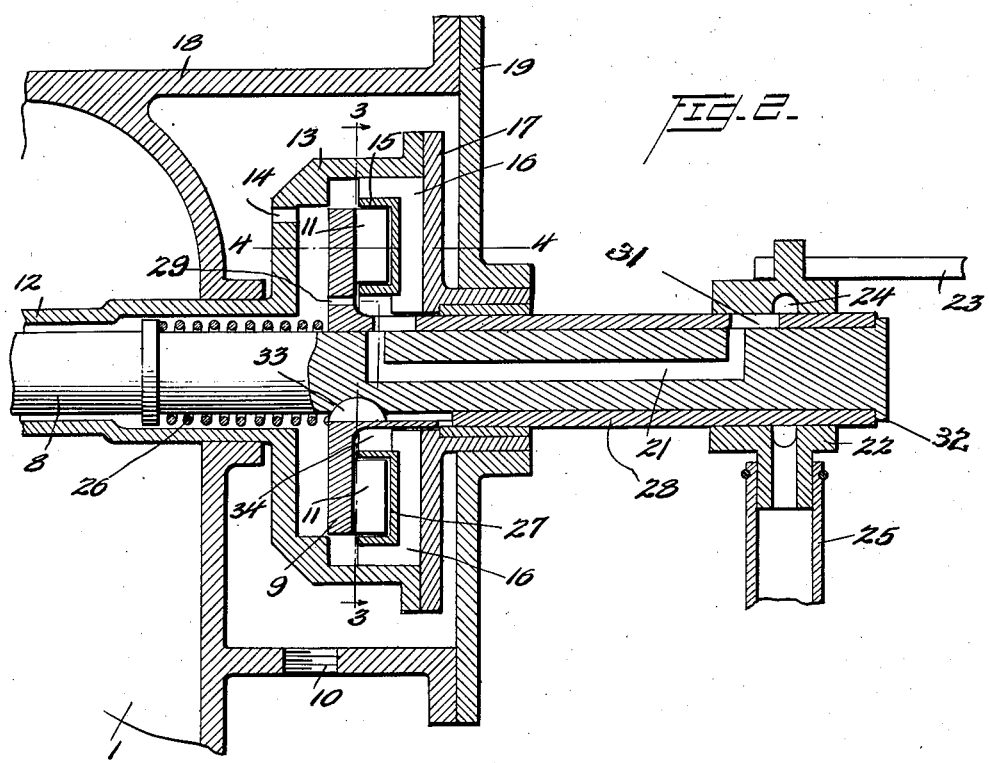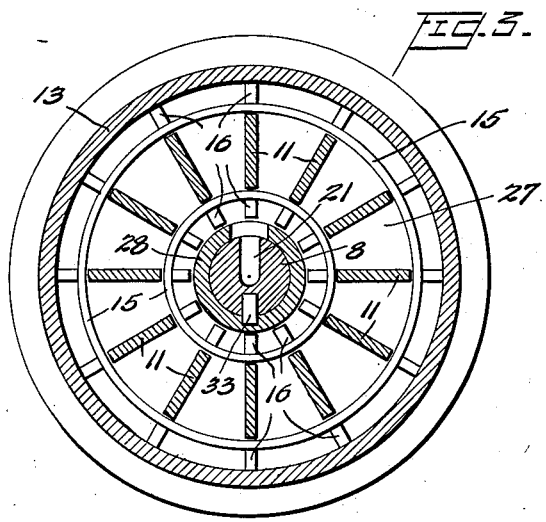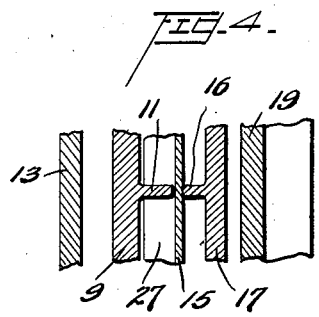

Patented Aug. 4, 1931                                                    1,817,650

UNITED STATES PATENT OFFICE

EARLE A. RYDER, OF WEST HARTFORD, CONNECTICUT, ASSIGNOR TO THE PRATT & WHITNEY AIRCRAFT COMPANY, OF HARTFORD, CONNECTICUT

VARIABLE SPEED SUPERCHARGER DRIVE

Application filed January 31, 1927. Serial No. 165,019.

This invention relates in general to internal combustion engines and more particularly to a variable speed drive for superchargers for use on such engines.

Superchargers for use on aircraft engines are designed to maintain full engine power at high altitudes with the result that, unless some means is provided to prevent such action, the engine is overcharged at, or near, sea level. As a consequence of such overcharging the engine detonates and overheats. Throttling the gas supply while permitting the supercharger to continue rotating at high speed is unsatisfactory since it causes excessive heating of the fuel gases. On the other hand it is not desirable to stop the supercharger altogether since it is useful for obtaining equal distribution of the gas to all of the cylinders. The most suitable means of control, therefore, is determined to be a means to provide for a variable reduction in the speed of the supercharger impeller. Owing to the high speeds involved in supercharging and the rigid requirements of light weight in aircraft, the customary speed reduction means is not feasible of satisfactory use.

My invention is disclosed as a flexible drive mechanism for the supercharger of an internal combustion engine, but it is applicable to other devices, especially those in which the power required for driving at the lower speeds is small as compared with that consumed at full speed operation, and in which, therefore, the efficiency of the drive at the lower speeds is of small importance.

It is an object of my invention to provide, in a power transmission train, a variable speed drive mechanism depending for its operation upon the effect, upon a driven member, of the drag of a body of viscous fluid set in motion by a driving member as well as the kinetic effect due to the motion of the said body of fluid.

It is a further object of my invention to provide means for varying, either automatically or manually, the degree of the drag effect upon the driven member and hence the speed of rotation of the same.

It is a prime object of my invention to employ such a variable speed fluid drive mechanism for driving the impeller shaft of the supercharger of an internal combustion engine, suitable means being provided for the automatic regulation of the speed of the impeller shaft to maintain a constant absolute pressure within the torus of the supercharger.

It is another object of my invention to provide a speed reduction means which shall be positive, though flexible in operation, and which shall be of a few, light, simple and inexpensively constructed parts.

Other objects of my invention will appear in the accompanying specification and claims and will be disclosed in the accompanying drawings in which—

Figure 1 is a longitudinal diametrical section through my device with the parts shown in the position to provide maximum impeller speed;

Figure 2 is an enlarged detail of my variable speed fluid drive shown in longitudinal diametrical section with the parts shown in position for minimum impeller speed;

Figure 3 is a section on the line 3—3 of Figure 2;

Figure 4 is a section on the line 4—4 of Figure 2.

Referring now with greater particularity to the drawings it will be seen that my device is comprised as follows:

The combustible mixture to be compressed is led through the inlet pipe 1, into the supercharger where it is compressed by the impeller 2 and discharged through the diffuser 3 into the torus or manifold 4. The drive shaft 8, supported by suitable antifriction bearings 6 in an extension 5 of the supercharger casing, is driven from the internal combustion engine, through suitable speed multiplying gearing, at the highest speed required for driving the impeller 2. The impeller 2 is mounted on and fixedly secured to, a sleeve or hollow shaft 12, which shaft is mounted concentrically of the shaft 8 and is freely rotatable thereon. Suitable anti-friction bearings 7 in the casing 5 support one end of the sleeve 12 and suitable packing 5a is provided to prevent escape of the combustible gases between the sleeve and the casing. The other end of the sleeve 12 is enlarged into a cup-shaped chamber 13 having a removable cover 17 on which a plurality of vanes 16 are formed. These vanes may be radial, oblique or spiral but not circumferential.

A rotor 9 is slidably mounted on the shaft 8 but restrained from rotation relative thereto by a key 33. The rotor is formed with vanes or blades similar to those at 16. A bushing 15 is secured to the vanes 16 in such a manner as to form an annular chamber 27. The rotor 9 is urged outwardly on the shaft 8 by spring 26, a shoulder 32 on the shaft providing a limiting abutment for the rotor hub 28. When the rotor is in its extreme outer position, the blades 11 are entirely inclosed by the bushing 15 but are not in frictional contact therewith. The rotation of the shaft 8 and the rotor 9 will not then be communicated to the vanes 16 and hence to the shaft 12 except by the viscous drag of whatever residual oil there may be within the bushing 15. The supercharger impeller 2, therefore, will be at rest or, perhaps, rotate very slowly.

A supply of oil or other fluid under pressure, is conducted through a flexible connection 25 to a collar 22 which is slidably mounted on the rotor hub 28. This collar can be moved axially of the hub 28 by means of a control rod 23 which may be actuated manually or, as shown in Figure 1, it is controlled automatically in relation to the absolute pressure existing in the manifold 4.

Referring now to Figure 2, assume that the parts are in the relative positions shown. If the collar 22 be moved slightly to the left, oil under pressure will be admitted through the passages 24, 31 and 21 formed in the collar 22, the rotor hub 28, and the shaft 8, respectively, and will enter the chamber 34. The pressure of the oil against the rotor 9 will force it inwardly against the action of the spring 26 until the motion of the rotor hub sleeve cuts off communication between ports 24 and 31, thus shutting off the supply of oil. The rotor 9 and the bushing 15 will now be slightly separated and the interior of the cup 13 will be filled with oil. Rotation of the blades 11 will be communicated to the oil between the blades, which oil will then be circulated centrifugally outward between the blades 11 and inwardly again between the blades 16. A continuous circulation will thus be set up.

Part of the rotational energy of the circulating oil will be surrendered to the blades 16 so that the cover 17, the cup 13, sleeve 12, and the impeller 2 will be revolved. Further movement of the collar 22 to the left will cause a corresponding inward movement of the rotor 9 increasing the distance between the rotor and the bushing 15, thereby causing more oil to be circulated. This in turn will increase the rotational speed of the cover 17 and the sleeve 12. Energy proportional to the product of the transmitted torque and the difference in speed of rotation between the rotor 9 and the sleeve cup 13 will be lost, and will appear as heat. To carry away this heat I have provided apertures 29, 14, and 10 which permit a flow of oil to be maintained through my device, the casing 18 and cover 19 acting as an oil cooling reservoir or radiator. In operation the ports 24 and 31 will not be entirely closed off from communication, but will remain open to a sufficient degree to supply as much oil as will escape from the aperture 29.

In Figure 1 the parts are shown in such a position that the vanes 11 are fully uncovered and the maximum pumping effect is obtained. This, however, does not cause the impeller 2 to rotate as fast as the shaft 8 since the transmission of torque by the device depends upon a difference in rotational speed between the vanes 16 and 11. To drive the impeller 2 at the highest possible speed, viz., the same speed as the shaft 8, the collar 22 is moved still further to the left admitting full oil pressure to the chamber 34 and forcing the rotor 9 against the inner face of the housing 13. Frictional contact is thus established at this point and a direct drive without slippage results. Communication between the apertures 29 and 14 is now interrupted since there is no further need of flow of oil through the mechanism.

In Figure 1 I have disclosed further automatic means for controlling the impeller speed comprising a casing 35 containing a flexible diaphragm 36, one side of which diaphragm is exposed to the pressure of a fixed quantity of air or other elastic fluid 37. The other side of the diaphragm forms one wall of a chamber 38 which communicates with the discharge pipe or torus of the blower through a tube 39. Any reduction in the pressure existing in the torus 4 will correspondingly reduce the pressure in chamber 38 allowing the air in the chamber 37 to expand and to move the collar 22 to the left, thereby giving rise to increased speed of the impeller 2 as has been explained hereinbefore. In the prior art relating to superchargers barometric or other pressure controlled means have been disclosed as providing means to prevent the over-speeding of the impeller to prevent over-supercharging. In this device there is no possibility of over-speeding since the maximum impeller speed is that of the direct frictional drive and is the speed required for the maximum supercharging effect. The remainder of the fluid speed reduction drive is to provide supercharging to a lower degree in accordance with the demands of the engine at lower altitudes. As has been explained, it is an object of this invention to maintain the absolute pressure in the torus as nearly constant as possible.

Having thus described my invention what I claim is—

1. In combination, in a power transmission train, a rotatable drive shaft, a driven shaft comprised of a sleeve mounted concentrically of said drive shaft and rotatable with respect thereto, said sleeve terminating in an enlarged cylindrical chamber, a cover for said chamber provided with a plurality of vanes mounted on the inner side thereof, a cup-shaped bushing mounted centrally of said cover, a rotor within said chamber mounted on said shaft slidable longitudinally thereof but non-rotatable with respect thereto, vanes on said rotor slidable into and out of said bushing, passages for conducting a body of viscous fluid to said chamber, and means for sliding said rotor longitudinally of said shaft to vary the amount of fluid admitted to said chamber.

2. In combination, in a power transmission train, a rotatable drive shaft, a driven shaft comprised of a sleeve mounted concentrically of said drive shaft and rotatable with respect thereto, said sleeve terminating in an enlarged cylindrical chamber, a cover for said chamber provided with a plurality of vanes mounted on the inner side thereof, a cup-shaped bushing mounted centrally of said cover, a rotor within said chamber mounted on said shaft slidable longitudinally thereof but non-rotatable with respect thereto, vanes on said rotor slidable into and out of said bushing, passages for conducting a body of viscous fluid to said chamber, and fluid operated means for sliding said rotor longitudinally of said shaft to vary the amount of fluid admitted to said chamber.

3. In combination, in a power transmission train, a rotatable drive shaft, a driven shaft comprised of a sleeve mounted concentrically of said drive shaft and rotatable with respect thereto, said sleeve terminating in an enlarged cylindrical chamber, a cover for said chamber provided with a plurality of vanes mounted on the inner side thereof, a cup-shaped bushing mounted centrally of said cover, a rotor within said chamber mounted on said shaft slidable longitudinally thereof but non-rotatable with respect thereto, vanes on said rotor slidable into and out of said bushing, passages for conducting a body of viscous fluid to said chamber, and pressure controlled fluid operated means for sliding said rotor longitudinally of said shaft to vary the amount of fluid admitted to said chamber.

4. In combination, in a power transmission train, a rotatable drive shaft, a driven shaft comprised of a sleeve mounted concentrically of said drive shaft and rotatable with respect thereto, said sleeve terminating in an enlarged cylindrical chamber, a cover for said chamber provided with a plurality of vanes mounted on the inner side thereof, a cup-shaped bushing mounted centrally of said cover, a rotor within said chamber mounted on said shaft slidable longitudinally thereof but non-rotatable with respect thereto, vanes on said rotor slidable into and out of said bushing, passages for conducting a body of viscous fluid to said chamber, means for sliding said rotor longitudinally of said shaft to vary the amount of fluid admitted to said chamber, and means for limiting the longitudinal movement of said rotor.

5. In combination, in a power transmission train, a rotatable drive shaft, a driven shaft comprised of a sleeve mounted concentrically of said drive shaft and rotatable with respect thereto, said sleeve terminating in an enlarged cylindrical chamber, a cover for said chamber provided with a plurality of vanes mounted on the inner side thereof, a cup-shaped bushing mounted centrally of said cover, a rotor within said chamber mounted on said shaft slidable longitudinally thereof but non-rotatable with respect thereto, vanes on said rotor slidable into and out of said bushing, passages for conducting a body of viscous fluid to said chamber, and pressure controlled fluid operated means for sliding said rotor longitudinally of said shaft to vary the amount of fluid admitted to said chamber, and means for limiting the longitudinal movement of said rotor.

6. In combination, in a power transmission train, a rotatable drive shaft, a driven shaft comprised of a sleeve mounted concentrically of said drive shaft and rotatable with respect thereto, said sleeve terminating in an enlarged cylindrical chamber, a cover for said chamber provided with a plurality of vanes mounted on the inner side thereof, a cup-shaped bushing mounted centrally of said cover, a rotor within said chamber mounted on said shaft slidable longitudinally thereof but non-rotatable with respect thereto, vanes on said rotor slidable into and out of said bushing, passages for conducting a body of viscous fluid to said chamber, pressure controlled fluid operated means for sliding said rotor longitudinally of said shaft to vary the amount of fluid admitted to said chamber, means for limiting the longitudinal movement of said rotor, and means for cooling said fluid.

7. In a variable speed supercharger transmission train, a rotatable drive shaft, a driven shaft including means for receiving the drive shaft and rotatable with respect thereto, the driven shaft including a chamber, means within the chamber for drivably connecting said shafts, and including a device rotatable with the drive shaft and slidable longitudinally within the chamber and rotatable with respect to the driven shaft, said means for drivably connecting the shafts also including means rotatable with the chamber and the driven shaft, and means for automatically controlling the movement of the longitudinally slidable portion of the drivably connecting means with respect to the chamber and to the other portion of the drivably connecting means to vary the rotation ratio of the driven shaft from between substantially zero to one to one to one with respect to the drive shaft.

8. In a variable speed supercharger transmission train, a rotatable drive shaft, a driven shaft including means for receiving the drive shaft and rotatable with respect thereto, the driven shaft including a chamber, means within the chamber for drivably connecting said shafts, and including a device rotatable with the drive shaft and slidable longitudinally within the chamber and rotatable with respect to the driven shaft, said means for drivably connecting the shafts also including means rotatable with the chamber and the driven shaft, and fluid operated means for automatically controlling the movement of the longitudinal slidable portion of the drivably connecting means with respect to the chamber and to the other portion of the drivably connecting means to vary the rotation ratio of the two shafts from between substantially zero to one to one to one.

In testimony whereof I affix my signature.

EARLE A. RYDER.